United States Patent [19]

Hilberg

[11] 3,772,652

[45] Nov. 13, 1973

[54] DATA STORAGE SYSTEM WITH MEANS FOR ELIMINATING DEFECTIVE STORAGE LOCATIONS

[75] Inventor: Wolfgang Hilberg, Thalfingen, Germany

[73] Assignee: Licentia Patent-Verwaltungs GmbH, Frankfurt am Main, Germany

[22] Filed: Oct. 29, 1971

[21] Appl. No.: 193,949

Related U.S. Application Data

[63] Continuation-in-part of Ser. No. 48,300, June 22, 1970, Pat. No. 3,693,159.

[30] Foreign Application Priority Data

| | | |
|---|---|---|
| Oct. 30, 1970 | Germany | P 20 53 260.9 |
| Nov. 28, 1970 | Germany | P 20 58 641.8 |
| Nov. 28, 1970 | Germany | P 20 58 698.5 |

[52] U.S. Cl. .......... 340/172.5, 235/153 AM
[51] Int. Cl. .......... G06f 11/00, G11c 19/00
[58] Field of Search .......... 340/172.5, 174 ED; 235/153 AM

[56] References Cited

UNITED STATES PATENTS

| | | | |
|---|---|---|---|
| 3,444,526 | 5/1969 | Fletcher | 340/172.5 |
| 3,541,525 | 11/1970 | Gange | 340/172.5 |
| 3,588,830 | 6/1971 | Duda et al. | 340/172.5 |
| 3,633,175 | 1/1972 | Harper et al. | 340/172.5 |
| 3,331,058 | 7/1967 | Perkins, Jr. | 340/172.5 |
| 3,654,610 | 4/1972 | Sander et al. | 340/172.5 |
| 3,222,653 | 12/1965 | Rice | 340/172.5 |
| 3,234,521 | 2/1966 | Weisbecker | 340/172.5 |
| 3,245,049 | 4/1966 | Sakalay | 340/172.5 |
| 3,350,690 | 10/1967 | Rice | 340/172.5 |
| 3,402,399 | 9/1968 | Bragg | 340/172.5 X |
| 3,422,402 | 1/1969 | Sakalay | 340/172.5 |
| 3,432,812 | 3/1969 | Elfant | 340/172.5 |
| 3,434,116 | 3/1969 | Anacker | 340/172.5 |
| 3,436,734 | 4/1969 | Pomerene et al. | 340/172.5 |

*Primary Examiner*—Paul J. Henon
*Assistant Examiner*—Melvin B. Chapnick
*Attorney*—Spencer & Kaye

[57] ABSTRACT

A data storage system containing an integrated memory for the storage of words of a given number of bits wherein the memory is constructed so that each word address in the memory is provided with a number of memory elements in excess of the given number of bits of the words to be stored. The unusable memory elements in the memory are identified by means of signals produced during interrogation of a word and circuitry is provided which responds to these signals for directing the data bits into those bit locations containing only usable memory elements during the writing operation and for eliminating the gaps between the data bits as the result of unusable memory elements in certain bit locations of a word address during read out by reading out only the information from usable storage elements. A number of techniques for identifying the unusable memory elements and for storing the information normally destined for an unusable storage element in a usable storage element are disclosed.

12 Claims, 9 Drawing Figures

DATA STORAGE SYSTEM WITH MEANS FOR ELIMINATING DEFECTIVE STORAGE LOCATIONS

CROSS REFERENCE TO RELATED APPLICATION

This application is a continuation-in-part of applicant's co-pending U.S. application Ser. No. 48,300 filed June 22, 1970 now U.S. Pat. No. 3,693,159.

BACKGROUND OF THE INVENTION

The present invention relates to a data storage system in which a very large number of identical memory or storage elements are combined into a memory in such a manner that words with a given number of bits are stored, and wherein due to the manufacturing process employed some of these memory elements are unusable. More particularly, the present invention relates to such a data storage system wherein additional memory elements are provided for each word in excess of the given number of bits for such word with the number of the additional memory elements being selected to correspond to the number of unusable memory elements to be expected for the particular word and wherein means are provided to eliminate unusable memory elements from further use.

According to the above-mentioned co-pending application, each of the memory elements is constructed and/or the unusable memory elements so modified that the unusable memory elements will produce a signal indicating the unusability thereof and means, including one or more shift registers and logic circuitry, are provided for shifting those bits which are to be stored in an unusable memory element to the next following usable memory element of the word during writing of a word into the memory and for reversing the process during read out.

SUMMARY OF THE INVENTION

It is therefore the object of the present invention to provide another arrangement for eliminating the unusable memory elements in such a memory matrix from use.

The above and other objects of the invention are achieved according to a first embodiment of the invention by providing a data storage system of the type mentioned above with a switching circuit arrangement which responds to a signal or signals identifying an unusable memory element in an addressed word so as to store the information intended for the V-th unusable memory element of a word, where $V=1,2 \ldots n$ and $n$ is the number of additional memory elements provided per word, in the V-th additional memory element for such word during writing of information into the memory and for reading out the information in the V-th additional memory element in place of the V-th unusable memory element of a word during read out. With this arrangement no shifting of data is involved.

According to one modification of this embodiment of the invention each of the unusable memory elements is modified so that it provides a distinctive output signal indicating its unusability when interrogated and these output signals are utilized to control the switching of the data to and from the additional memory elements.

According to a further feature of this embodiment of the invention, in order to decrease the time required for the switching operations to take place, each word is divided into a plurality of partial words, additional memory elements are provided for each partial word, and a separate switching circuit arrangement is provided for each partial word to control the flow of data to and/or from the additional memory elements of each partial word.

According to a further modification of this embodiment of the invention, each word in the memory matrix is provided with a plurality of additional special memory cells in which the bit location of an unusable memory element of the word is stored, and the switching circuit arrangement is responsive to the output signals from these special memory cells during interrogation of the associated word to control the flow of data to and/or from the additional memory elements.

According to a further embodiment of the invention, wherein only one additional memory element is provided per word, each word in the memory matrix is provided with a plurality of special memory cells in which the bit location of an unusable memory element of the word is stored, and a logic switching arrangement is provided which responds to the outputs from the special memory cells during interrogation of a word to switch the input and/or output line to the memory matrix associated with the unusable memory element and all succeeding memory elements to the next succeeding memory element of the word during read out and writing-in of data from and to the memory. This has the effect of the shifting operation performed in the above-mentioned co-pending patent application but accomplishes it in a much simpler manner when only one additional memory element is provided.

According to still a further embodiment of the invention for a memory wherein each of the memory elements is of the type which can be non-destructively read out and wherein each of the unusable memory elements has been modified so that it provides a distinctive output signal indicating its unusability when interrogated, a logic switching arrangement is provided which responds to these output signals so as to switch the data intended for an unusable memory element during writing of a data word to the next succeeding usable memory element of the word and each of the succeeding data bits of the word to the successive usable memory elements. A word select pulse generating circuit is provided for interrogating each of the memory elements of the desired word prior to the writing of information in order to provide the distinctive output signals from the unusable memory elements to which the switching arrangement responds, and the duration of the word select pulse is sufficiently long to permit the switching arrangement to respond and make the proper interconnections to the usable memory elements. As a result of this increased duration for the word select pulse for this type of memory matrix the shift registers required in the embodiments of the invention disclosed in applicant's co-pending application may be eliminated.

DESCRIPTION OF THE PREFERRED EMBODIMENTS

Figure 1:
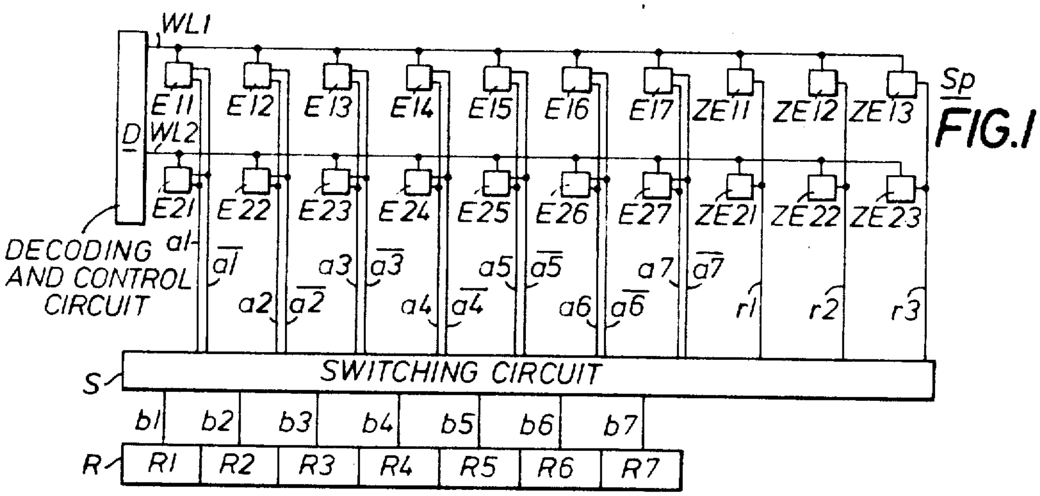
FIG. 1 is a block circuit diagram of one embodiment of a memory arrangement and circuitry therefor according to the present invention.

Referring now to FIG. 1 there is shown a word oriented address controlled memory *Sp* which can store N words each having a length of seven bits. To simplify the drawing only the memory elements of two such words of the memory are illustrated. That is memory elements E11 – E17 are used to store the bits of one word and memory elements E21 – E27 are used to store the bits of the second word. The individual words can be addressed or interrogated by a decoding and control circuit D via respective word lines WL1 and WL2. The outputs of all of the memory elements in the same bit locations of the respective words are connected together to common bit lines. That is, the memory elements E11, E21, . . . EN1 are connected together as are the outputs of memory elements E12, E22, . . . EN2, etc. In the illustrated and described embodiment of the invention, each memory element of the memory word has two outputs which are connected to a respective pair of column output lines. The common pair of output lines for the memory elements in each column are marked *a* 1, $\overline{a1}$, *a*2, $\overline{a2}$, . . . *a*7, $\overline{a7}$, respectively.

In addition to the memory elements E11 – E17 and E21 – E27 for the normal storage of the respective bits of each word, each of the words or rows of the memory is provided with additional reserve memory elements ZE11 – ZE13 and ZE21 – ZE23, respectively, which are also connected to the respective word lines WL1 and WL2. The number of additional memory elements ZE provided per word is equal to the number of unusable memory elements E permissible per word. Consequently, according to a first embodiment of the present invention wherein it is permissible to have only one unusable memory element in each memory word, only the additional memory element marked ZE11 or ZE21 in FIG. 1 is provided. The other additional memory elements marked ZE12, ZE13, and ZE22, ZE23 in FIG. 1 are provided only when it is permissible to have three unusable memory elements E in each memory word.

The common output lines *a*1, $\overline{a1}$, . . . *a*7, $\overline{a7}$ for each column of the memory elements E lead to a switching circuit S as do the common column output lines *r*1, *r*2 and *r*3 of the additional memory elements. The output lines *b*1 – *b*7 of the switching circuit S are connected respectively to seven register stages R1 – R7 of a memory write-in and read out register R.

One embodiment of the present invention will now be explained in which it is permissible for a maximum of one unusable memory element E to be present in each memory word. Thus in this case the additional memory elements ZE12, ZE13, AE22, ZE23 shown in FIG. 1 are not required. The memory elements of the memory are so designed that during read out a determination can be made as to whether a particular memory element being read out is usable or unusable. This differentiation may be made, for example, in the following different ways:

Initially it is possible to provide a memory element wherein information corresponding to a stored 0 produces a potential during read out on one of the read out lines, e.g., *a*1, which corresponds to the logic 0 and a potential which corresponds to a logic L on the other read out line $\overline{a1}$. When a stored L is being read out, the above-mentioned potentials in the read out lines are reversed. An unusable memory element is distinguished in that a potential pair with different values from the above-mentioned values appears on the two read out lines, e.g., a potential corresponding to logic L appears in both read out lines. This above-described possibility, which is more fully described in the above-mentioned co-pending application, forms the basis of the further explanation of the embodiment of the present invention.

Further possibilities for determining the presence of a faulty memory element would be, for example, to modify the unusable memory elements in such a way that a potential different from those corresponding to logic 0 and L would appear in a single line (in this case only a single read out line would be required) or that the memory element emits a certain signal over an additional line when the memory element is faulty. These possibilities seem to have smaller advantages at the time.

The switching circuit S is so designed according to this present invention that it detects the signals appearing in the read out lines during read out if any and which memory element of the word being read out is unusable, and then feeds the information stored in the additional memory element ZE11 (if the word E11 – E17 was the one read out) to the read out register R in place of the information associated with this faulty element. For example, if memory element E13 has been found to be faulty or unusable during reading out or interrogation of the first word, switching circuit S causes the information of memory elements E11, E12 to be switched directly to register cells R1, R2, respectively, and the information of memory elements E14 – E17 to be switched directly to register cells R4 – R7, respectively, but causes the information contained in the additional memory element ZE11 to be switched through to register cell R3 by connecting *b*3 to *r*1 rather than to *a*3.

The storing of a word into the memory at an earlier time occurs in an analogous manner so that if it is again assumed that the memory element E13 is unusable, the information contained in register stages R1, R2 and R4 – R7 is stored directly into memory elements E11, E12 and E14 – E17, respectively, and the information contained in the register stage R3 is fed to the additional memory element ZE11. In order to be able to store without errors, it is necessary in this case that the switching circuit S recognize which of the memory elements is unusable either before or during writing of information into the memory.

Figure 2:
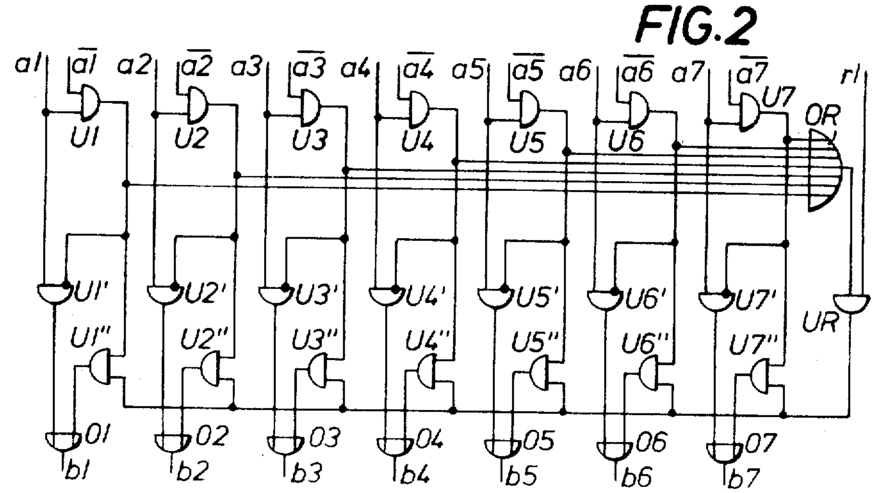
FIG. 2 is a logic circuit diagram for the switching circuitry of FIG. 1 which can be used when a single additional memory element is provided for each memory word.

FIG. 2 shows an arrangement which permits, under the assumption that no more than one unusable memory element is present for each word, a stored information to be read out in the above-described manner.

The arrangement of FIG. 2 contains a first group of AND gates U1 - U7 which serve to recognize the location of an unusable memory element, a second group of AND gates U1' - U7' which serve to establish a connection to the output line for a usable memory element, a third group of AND gates U1'' - U7'' which serve to establish a connection between the additional memory element and the output line for the column containing an unusable memory element, a group of OR gates 01 - 07 and a logic network including further OR gate OR having seven inputs and a further AND gate UR for determining if the third group of AND gates U1'' - U7'' is to be enabled. The two inputs of AND gate U1 are connected with the two output lines *a*1 and $\overline{a1}$ of the first column of the memory. The inputs of the other AND gates U2 - U7 of the first group are connected to the associated column lines of the memory in an analogous manner. The readout line a1 is also connected to one input of AND gate U1' whose other input is negated and connected to the output of AND gate U1. The output of AND gate U1' is in turn connected to one input of OR gate 01 whose other input is connected with the output of AND gate U1''. One input of AND gate U1'' is connected with the output of AND gate U1, while the second input of the AND gate U1'' is connected with the output of AND gate UR. The output of AND gate U1 is additionally connected with one input of OR gate OR whose output is connected with one input of AND gate UR while the second input of gate UR is connected with the readout line *r*1 of the additional memory elements ZE11, ZE21, etc. The other AND gates U2 - U7, U2' - U7', U2'' - U7'' are interconnected in an analogous manner.

The above-described circuit operates in the following manner: For purposes of explaining the operation it shall be assumed that the third memory element E of the word being read out is unusable, i.e., that a potential with the value L appears in both line *a*3 and line $\overline{a3}$, while all of the other pairs of read out lines show different values from each other and the value appearing at the read out line *r*1 corresponds to either logic 0 or L depending on the information contained in the additional memory element ZE being addressed. Due to the appearance of a logic L signal on both lines *a*3 and $\overline{a3}$, AND gate U3 furnishes a logic L signal at its output while all the other AND gates U1, U2 and U4 - U7 of the first group furnish a logic 0 signal at their outputs. The logic L signal at the output of AND gate U3 is fed to OR gate OR which enables AND gate UR and thus permits a logic L which might appear in read out line *r*1 to be switched through. The logic L at the output of the AND gate U3 blocks, via the negated input of AND gate U3', the direct switching through of the read out information to OR gate 03 and thus to line *b*3. Instead, the information coming from the additional memory element which appears at the output of AND gate UR is fed to OR gate 03 via AND gate U3''. For all other addressed memory elements E of the memory the associated AND gates of the first group are blocked, those of the second group are conductive and those of the third group are blocked so that the information of these usable memory elements is switched through directly to the output lines *b*1, *b*2 and *b*4 - *b*7.

Figure 3:
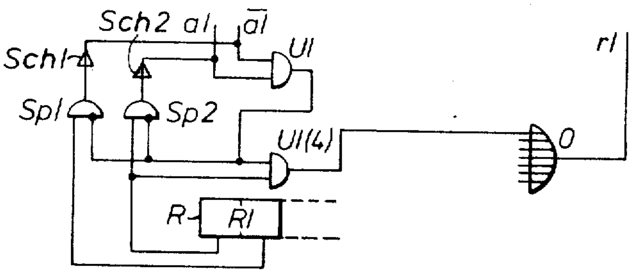
FIG. 3 is a logic circuit diagram illustrating the write-in circuitry for the embodiment of FIG. 1.

FIG. 3 shows (only for one location) a circuit which can be used for storing information in the above-described memory. The AND circuits U1 - U7 of the first group are again provided in order to recognize the unusable memory elements. For reasons of simplicity only AND gate U1 is illustrated. A fourth group of AND gates U1(4) to U7(4) is provided of which only AND gate U1(4) associated with the first column of the memory is shown. The output of AND gate U1 is connected to one input of AND gate U1(4), and the second input of the AND gate U1(4) is connected with the true output of the first register stage R1. Register R in this case contains that information which is to be stored in the memory. The storing is done in that the information contained in the register is fed, via blocking circuits (AND GATES) S*p*1 and S*p*2 whose negated input is connected with the output of AND gate U1, writing amplifiers S*ch*1 and S*ch*2 and lines *a*1, $\overline{a1}$, respectively, to the memory element of the addressed memory word. AND gate U1 is connected with the two lines *a*1 and $\overline{a1}$ exactly as in the arrangement of FIG. 2. The gates for the other bit locations are connected together in the same manner, and the outputs of AND gates U1(4), U2(4), . . . U7(4) are each connected with a separate input of an OR circuit O whose output is connected with the additional memory elements ZE11, ZE21, etc. via line *r*1.

If read out took place before writing-in, the output of the AND gate of the first group associated with an unusable memory element shows a logic L signal. This value is maintained as long as a word selection pulse is applied. The pulse must thus be long enough so that if, for example, the first memory element of the addressed word is unusable, and thus AND gate U1 furnishes a logic L signal at its output during read out, and if the register stage R1 contains a logic L, this information is fed via AND gate U1(4) and OR gate 0 to the additional memory element ZE of the addressed word. If a 0 was contained in register stage R1, AND gate U1(4) is not switched through, and it must then be assured that before the onset of the writing-in process the additional memory elements ZE are all set to 0 or that whenever OR gate 0 furnishes a 0 during writing-in, the corresponding additional memory element ZE is set to 0.

It is possible to make the determination as to whether a memory element E of the addressed word is unusable during the writing of a word into the memory, e.g., in one clock period. This determination results from the fact that whenever a word interrogation pulse is present, if only the write-in pulse is delayed by a short period of time with respect thereto, the unusable memory element E furnishes the value for a logic L at both output lines *a*, $\overline{a}$ thereof and thus blocks the gates S*p*1 and S*p*2 connected ahead of the writing amplifiers. At the same time the corresponding AND gate U1(4) is switched through and the information contained in the corresponding register cell R*n* can be fed to the additional memory element 7E. Even after completion of the writing process the determination of an unusable element is possible. If the information contained in Register R is present for a sufficiently long time, the information which was not stored in the unusable memory element can also be transferred later on to the additional memory element.

One embodiment of the present invention will now be explained in which it is permissible for a memory word to contain a maximum of three unusable memory elements. A CONSIDERATION of FIG. 1 must now be based on the assumption that the additional memory elements ZE12, ZE13, ZE22, ZE23, etc. are also provided.

Figure 4:
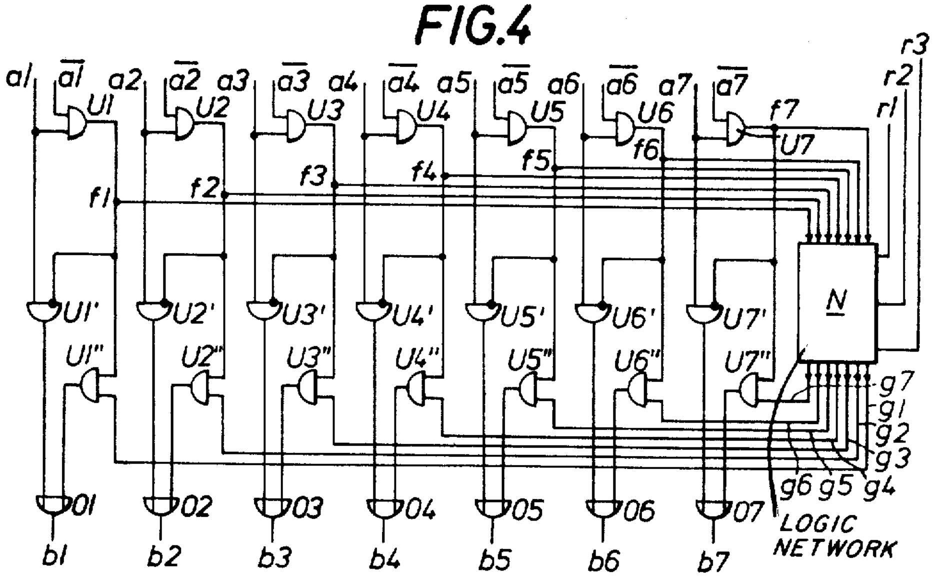
FIG. 4 is a logic circuit diagram for the switching circuitry of FIG. 1 which can be used when three additional memory elements are provided for each memory word.

FIG. 4 shows an arrangement which can be used for reading out of such a memory. The arrangement of FIG. 4 is very similar to that of FIG. 2, the only difference is that the outputs $f1 - f7$ of the AND gates U1 - U7, respectively, are not connected to a common OR gate OR, but rather they lead to the inputs of a logic network N, and at inputs of the AND gates U'' - U7'' which are not connected with the output of the associated AND gate U1 - U7 are here not connected together but are individually connected to separate output lines $g1 - g7$, respectively, of the logic network N. The logic network N has three further inputs which are connected with the common read out line $r1$, $r2$ and $r3$ of the respective columns of the additional memory elements.

For purposes of explanation it will be assumed that the third, fourth and sixth memory elements, e.g., E13, E14, and E16, of the word being addressed are unusable, and that a word has previously been stored in the memory. According to the invention the word is stored so that the information intended for the third memory element, i.e., the first unusable memory element of a word, is stored in the first additional memory element, i.e., ZE11, the information for the fourth memory element, i.e., the second unusable memory element of a word is stored in the second additional memory element, i.e., ZE12, and the information intended for the sixth memory element, i.e., the third unusable memory element of a word is stored in the third additional memory element, i.e., ZE13. During read out it is determined, in a manner similar to that described in connection with FIG. 2, which memory elements are unusable. Logic network N is designed so that it feeds to the individual AND gates U1'' - U7'' which are associated with the respective unusable memory elements that information appearing at the output lines $r1 - r3$ which is associated with the respective unusable memory elements. As indicated the assigning during writing-in and reading out by logic network N is preferably effected in such a manner that the first additional memory element is associated with that unusable memory element which is disposed farthest to the left, the second additional memory element is associated with the next following memory element on the right; and the third additional memory element is assigned in an analogous manner. In the illustrated example, wherein the third, fourth and sixth memory elements are unusable, the logic network N connects the lines $r1$, $r2$, and $r3$ to the output lines $g3$, $g4$ and $g6$, respectively.

Figure 5:
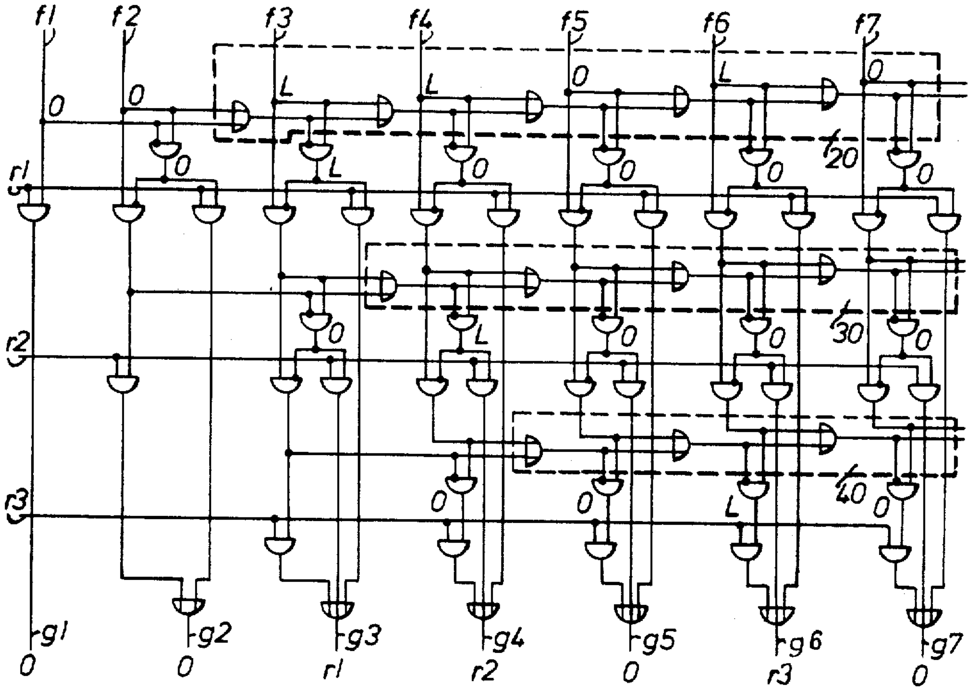
FIG. 5 is a detailed logic circuit diagram for a portion of the circuit of FIG. 4.

FIG. 5 shows an embodiment of a circuit arrangement which can be used for the logic network N when seven bits are to be stored in one memory word, a maximum of three defective memory elements being permissible per word. The circuit arrangement contains a first group of OR gates 20, a second group of OR gates 30, and a third group of OR gates 40. Additionally, a plurality of AND gates are provided in the circuit arrangement whose interconnections with one another and with the OR gates are shown in the drawing. The individual groups of OR gates, together with the AND gates connected thereto, form a first-L-from-the-left circuit. The first first-L-from-the-left circuit, (OR group 20) receives signals via lines $f1 - f7$ which are connected to the outputs of AND gates U1 - U7, respectively, which indicate that one of the addressed memory elements is defective. In FIG. 5, three of the input lines $f1 - f7$, i.e., lines $f3$, $f4$ and $f6$ are provided with a logic L which indicates that the corresponding memory elements are unusable. The individual first-L-from-the-left circuits are now linked in such a manner that in the second first-L-from-the-left circuit (OR group 30), the first logic L signal from the left which was fed to OR gate group 20, i.e., the logic L signal on line f3 is no longer effective, and that for the third first-L-from-the-left circuit (OR group 40) the first logic L signal from the left, i.e., the logic L signal on line $f3$ as well as the second logic L signal from the left, i.e., the logic L signal on line $f4$, which were fed to the first OR group are no longer effective. As can be easily determined the circuit arrangement according to FIG. 5 effects switching through of the information originating from the first additional memory element and present on line $r1$ to that output line which is associated with the first defective memory element from the left, i.e., the line $g3$, the information present at input line $r2$ which originates from the second additional memory element is fed to the output line $g4$ which is associated with the second unusable memory element, and the information coming from line r3 is switched through to the output line $g6$ associated with the third unusable memory element.

As can easily be appreciated, switching circuit arrangements S (see FIG. 1) which permit the occurrence of, e.g., three unusable memory elements in a word (see FIG. 5) are much more complicated than a switching circuit arrangement which permits only the occurrence of a single unusable memory element (see FIG. 2). Moreover, in the latter type circuit arrangement the signal passage times are shorter. It is therefore advantageous, under certain circumstances in a case where the occurrence of several unusable memory elements in a single word of the memory must be expected, to divide each of the words in the same manner into a number of partial words so that each partial word can be expected to have only a certain small number of unusable memory elements, and preferably, only a single such unusable element. For this latter case a single additional memory cell must be provided for each partial word, and the partial words are combined into groups corresponding to their position within the word and a switching circuit arrangement which ensures that an unusable memory element of the partial word being addressed will not be used is provided for each such group.

Figure 6:
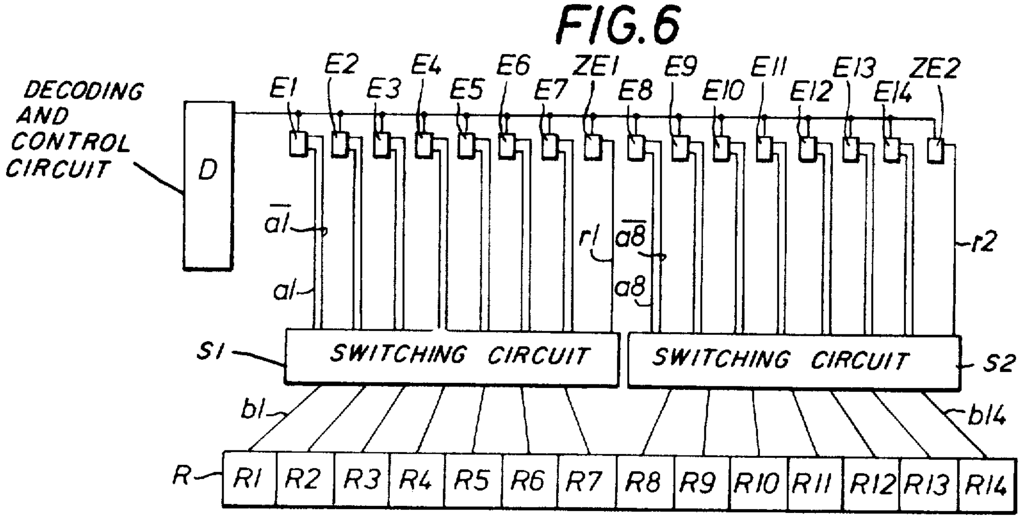
FIG. 6 illustrates another embodiment of a memory arrangement and circuitry therefor according to the present invention.

FIG. 6 shows such an arrangement but for reasons of simplicity only a signel 14 bit word is shown in the drawing. The illustrated partial word includes two partial words, one of which contains memory elements E1 - E7 and the additional memory element ZE1, and the other of which contains memory elements E8 - E14 and the additional memory element ZE2. A pair of switching circuit arrangements S1 and S2, one for each of the partial words, is provided. Since only one additional memory element is provided per partial word, each of the circuits S1 and S2 may be the same as that shown in FIG. 2. By means of circuit S1 memory element ZE1 may replace an unusable memory element contained in the first partial word, i.e., E1 – E7, and by means of circuit S2 additional memory element ZE2 may replace an unusable memory element in the second partial word, i.e., E8 – E14. The inputs/outputs *b*1 – *b*7 of switching circuit S1 are connected to register stages R1 – R7, respectively, and the inputs/outputs *b*8 – *b*14 of switching circuit S2 are connected to register stages R8 – R14, respectively, of a write-in/read out register R. It is to be understood that although the embodiment of FIG. 6 has been illustrated for use with only two partial words and only a single additional memory element per partial word that, if desired, a plurality of additional memory elements may be provided for each partial word and a greater number of partial words may be utilized.

In the drawings the memories which are addressed word-by-word are shown as being addressed by means of a single decoding and address circuit D. However, particularly for large-size integrated memories, the memory preferably will be divided into monolithic bit planes with each bit plane having its own decoding and address circuit for contacting reasons and to provide better error protection.

When the memory is divided into bit planes it is also possible to distribute the switching circuits to the individual bit planes in that individual switching elements of the switching circuits are applied to those bit planes to which they are associated in function. In this sense, for example, gates U1, U1', U1'' and 01 of the arrangement of FIG. 2 may be accomodated on that bit plane where the memory elements for the first bit of the memory words are disposed.

According to a further embodiment of the present invention, in the case where more redundant memory cells can be tolerated, it is provided that the positions of the unusable memory elements need not be determined each time during writing-in or reading out of information from the memory. That is, signals identifying the bit location of the unusable memory elements are stored in additional special memory cells provided per word so that the location signals are available when the special memory cells are interrogated. This embodiment will be explained in connection with FIGS. 7 and 8.

Figure 7:
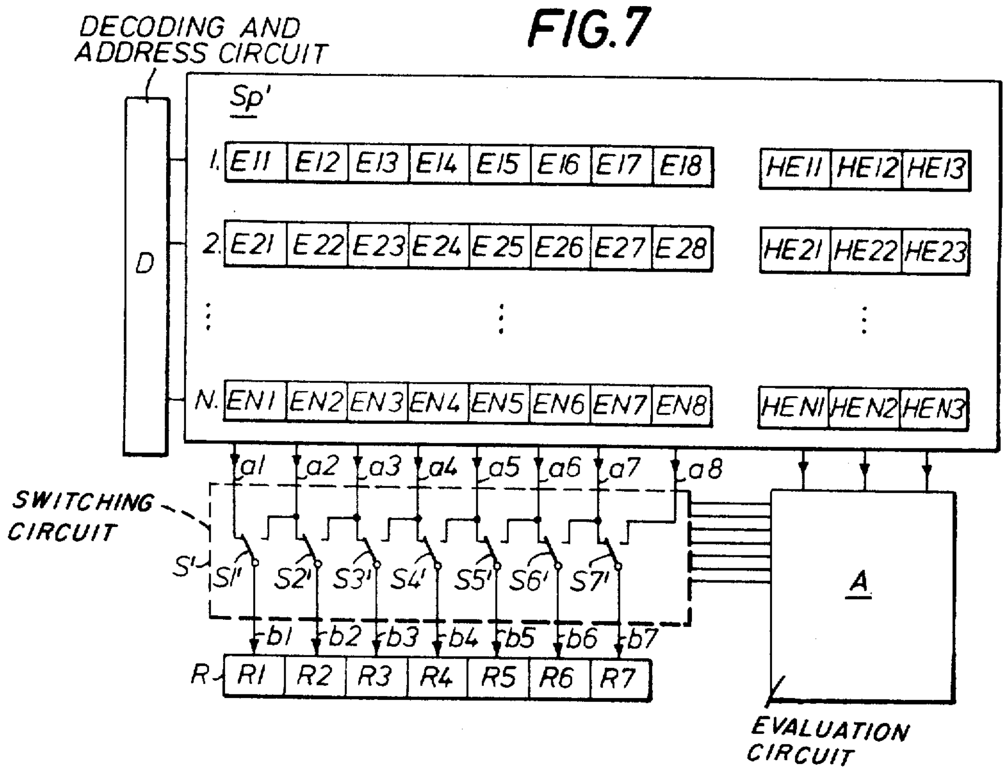
FIG. 7 is a block diagram of a further embodiment of a memory arrangement and switching circuitry therefor according to the present invention.

FIG. 7 shows a memory S*p*' which in the illustrated example consists of a total of N words each having a length of eight bits. (To simplify the drawing only the first, second and N-th word are shown). The memory is addressed word-by-word by a decoding and address circuit D, read out takes place in such a manner that the output lines of the first bits of each word (E11, E21, . . . EN1) are connected together (not shown) and are brought to a common memory output line *a*1. In the same manner the output lines of the second, third, etc. bits of each word are also each brought to a common output line *a*2 – *a*8, respectively. Memory S*p*' is assumed to be so designed that no more than one unusable memory element can occur in one word, for example, by appropriately selecting and orienting the semiconductor slices required to construct the integrated memory. In other words, therefore, the memory is designed to store words containing seven bits but is provided with an additional eighth memory element per word in order to provide for the possiblity that one of the memory elements normally used to store the seven bit word is unusable.

In order to be able to identify an unusable memory element during interrogation or address of a memory word, each word in the memory is provided with three additional special memory cells HE11 to HE13, HE21 to HE23, etc. which are addressed together with the other memory elements of a word. In these special memory cells, e.g., HE11 – HE13, signals indicating the bit location or position of an unusable memory element, e.g., E11 – E17 are stored. This may be done, for example, by testing the memory upon completion with a test program to determine the bit location of the defective memory element and then storing the signals identifying same in the special memory cells. Accordingly, the special memory cells may be designed so that they are read out without changes once they have been set, e.g., as PROM cells.

When a word of the memory is addressed, the corresponding special memory cells emit an output signal which is decoded by an evaluation circuit A. The evaluation circuit A controls a switching circuit S' in such a manner that both during writing-in and reading out of information to and from memory S*p*', the defective or unusable memory element is eliminated. For this purpose switching device S' contains switches S1' – S7' which are shown in their normal switching position. Each of the switches S1' – S7' is connected via a line *b*1 – *b*7, respectively, to a respective one of the stages R1 – R7 of an input/output register R and is capable of selectively connecting its associated line to the output lines of two adjacent bit locations from the memory S*p*'. That is, switch S1' is able to selectively switch through the outputs of the first or second memory elements in the addressed word (starting from the left) of the memory S*p*' to a register stage R1, by connecting line *b*1 to either line *a*1 or *a*2, switch S2' permits the selective connection of the outputs of the second or third memory elements, i.e., lines *a*2 or *a*3 to the register stage R2 via line *b*2, etc., until switch S7' which permits the selective connection of the outputs of the seventh or eighth memory elements, i.e., lines *a*7 or *a*8 to a register stage R7.

The switching circuit S' is designed so that that switch whose number corresponds to the unusable bit of a memory word and all switches having a higher number establish a connection between their associated register stage and the respectively higher one of their associated memory elements, while the switches which have a number which is lower than the number of the switch corresponding to the unusable memory element effect the connection of the associated register stages with the respectively lower numbered memory elements. For example, assuming that the first word is being addressed and that memory element E14 is defective or unusable, the signals identifying bit location of E14 are stored in memory cells HE11 – HE13. Upon application of an address signal to the first word from the circuit D, the output signals from special memory cells HE11 – HE12 are detected by evaluation circuit A which produces output signals causing switch S4', which is normally associated with the unusable memory element E14, to switch to its alternate position and establish a connection between *b*4 and *a*5. Simultaneously, the output signals from circuit A causes switches S5' – S7' to also switch to their alternate positions but does not effect any switching of the switches S1' – S3'. Consequently, at the end of the switching operation register stages R1 – R3 are connected to lines *a*1 – *a*3, respectively, and register stages R4 – R7 are connected to lines *a*5 – *a*8, respectively, line *a*4 associated with the unusable memory element E14 is thus not connected to any of the stages of the register R.

Although switches S1' – S7' are shown in FIG. 7 as mechanical switches, it is to be understood that preferably electronic switches will be used for this purpose. For example, the following circuit for switch S1' will be sufficient: One And-gate with the input *a*1 together with a control input; a second And-gate with the input *a*2 together with a negated control input; and an OR-gate which combines the outputs of both AND-gates and whose output is identical with *b*1. The evaluation circuit A may be designed in a well known manner. The data in the three additional cells HE of one word are fed to a decoder "one L output among seven 0 outputs." All the eight outputs are fed to a chain of Or gates as, e.g., 20 in FIG. 5 (instead of the signals *f*). Consequently the negated outputs of these Or gates are identical with the above mentioned control inputs.

Figure 8:
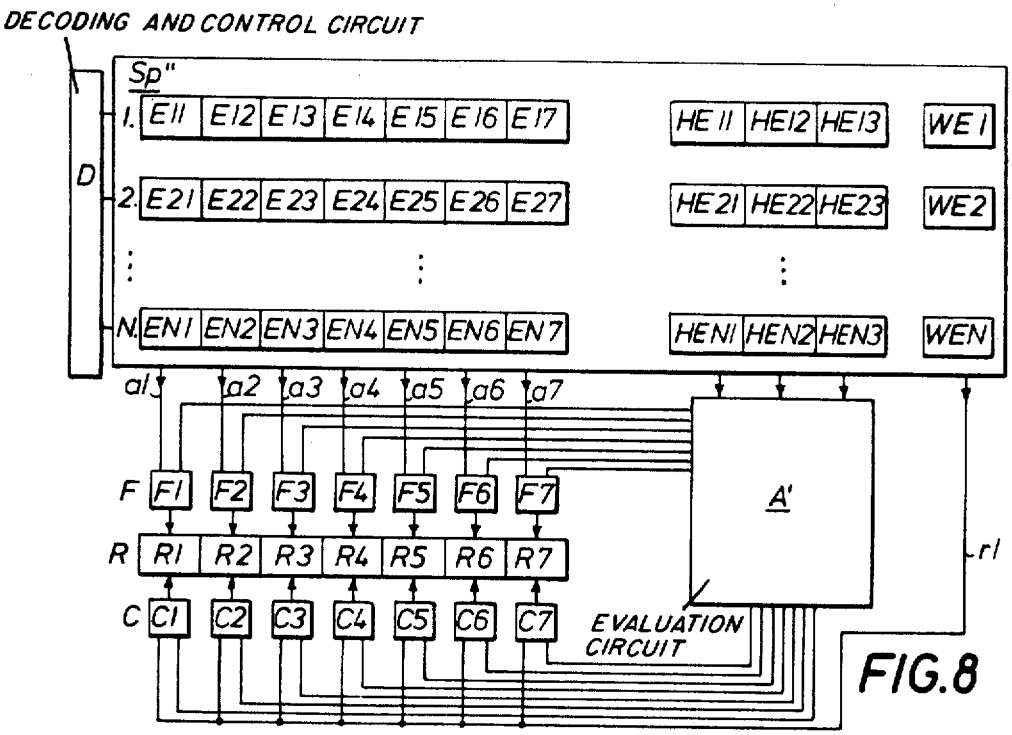
FIG. 8 is a block diagram of still a further embodiment of the invention which utilizes features of both the embodiments of FIGS. 1 and 7.

FIG. 8 shows a further embodiment of the invention which in some respects is similar to the embodiment of FIG. 7 and in other respects is similar to the embodiment of FIG. 1. The memory S*p*'' is similar to the memory S*p*' of FIG. 7 in that each memory word contains three special memory cells, e.g., HE11 – HE13 in which signals indicating the bit location of an unusable memory element in the associated word are stored. Contrary to the arrangement of FIG. 7, each word is provided with only seven normal information-carrying memory elements, e.g., E11 – E17 for the storage of a seven bit word. Accordingly, since one unusable memory element per word is to be permitted, in a manner similar to the FIG. 1 arrangement each memory word is provided with an additional memory element WE1 to WEN, respectively. The outputs of all of the memory elements for each bit location of all memory words are again connected together and brought to respective common output lines *a*1 – *a*7. Each bit output line of the memory Sp'' is connected via a respective switch F1 – F7 of a switching circuit F with a respective stage R1 – R7 of Register R. A control input of each one of switches F1 to F7 is connected with an evaluation circuit A'. Each register stage R1 – R7 is also connected, via a further switch C1 – C7, respectively of a switching circuit C with the common output line *r*1 for all of the additional further memory elements WE1 – WEN. A control input of each one of switches C1 to C7 is connected to the evaluation circuit A'.

For the description of the operation of the arrangement let it be first assumed that the first memory element of the first memory word be unusable, i.e., memory element E11. Consequently, the three special memory cells HE11 – HE13 associated with this first memory word contain the bit combination 0 0 L which identify the memory element E11 as being unusable. The writing in of a word stored in register R into the memory Sp'' is now effected in such a manner that the second to seventh bits of the word contained in register stages R2 – R7, respectively, are stored, via the respective switches F1 to F7, in the second to seventh memory elements (E12 to E17) of the memory and that the bit contained in the first register stage R1 is stored via switch C1 in the additional memory element WE1. To achieve this result, the evaluation circuit A' responds to the signals from memory cells HE11 – HE13 and controls the individual switches F1 to F7 and C1 to C7 in such a manner that with a defective first memory element E11 in the memory, switch F1 is blocked and all further switches F2 to F7 are made conductive and switch C1 is made conductive and all other switches C2 – C7 are blocked. The switching circuit C is controlled in an analogous manner when other memory elements of the memory are defective. During read out the same control process again takes place with a transfer of data in the reverse direction. The evaluation circuit A' in FIG. 8 may be simply a well known decoder "one L output among seven 0 outpus" and the signals of these outputs may lead outputs"to the F switches whereas the inverted signals of the same outputs may lead to the C switches. Therefore the evaluation circuit A' will only cause a very short time delay during a read operation.

In the arrangement according to FIG. 7 as well as in the arrangement according to FIG. 8 it has been found advantageous to provide special memory cells of a type whose probability of errors is much less than the probability of errors in the information carrying memory elements in the memory. In fact, it may be advisable under certain circumstances to even provide memory elements for this purpose which have no defects at all.

In memories whose individual words contain very many digits it may be difficult, under certain circumstances, i.e., with given manufacturing conditions, to realize a group of special memory cells which is without defects. According to a modification of the present invention this group of special memory cells may be designed as provided in the above-mentioned co-pending parent application. That is, additional memory cells are provided for each word in excess of the number of bits required in each group of special memory cells, the number of the additional memory cells being selected to correspond to the number of unusable memory cells to be expected for the special memory cells, and the unusable memory cells of the group are modified in such a manner that during interrogation they emit signals which indicate the unusability of the memory cells and measures are taken during read out which prevent an evaluation of the information stored in the defective memory cells.

It is possible and advantageous to effect a parity control for each memory word by providing still a further memory cell for each word which permits a parity control of the read out word so that errors in the memory which vary in time can be detected. In the described examples of FIGS. 7 and 8 only one unusable memory element is permissible per memory word. If more unusable memory elements per word are to be permitted, the number of special memory cells provided for each word must be correspondingly increased so that sufficient memory cells are available for storing the bit locations of the unusable memory elements.

According to a further embodiment of the present invention it is possible to simplify the data storage system arrangements according to the above-mentioned co-pending application when memories are used which can be read out without destruction of their contents and wherein the unusable memory elements are constructed or modified so that they provide distinctive output signals when interrogated. According to this embodiment, before writing-in of a word to the memory which can be read out without destruction of its contents, a word selection pulse is fed to the respective memory elements to effect a prior read out for determining the unusable elements, and this word selection pulse is of such a duration that the logic network which is connected with a portion of the read out lines can effect the required linkages and the necessary switching processes required to permit writing into only the usable memory elements.

Figure 9:
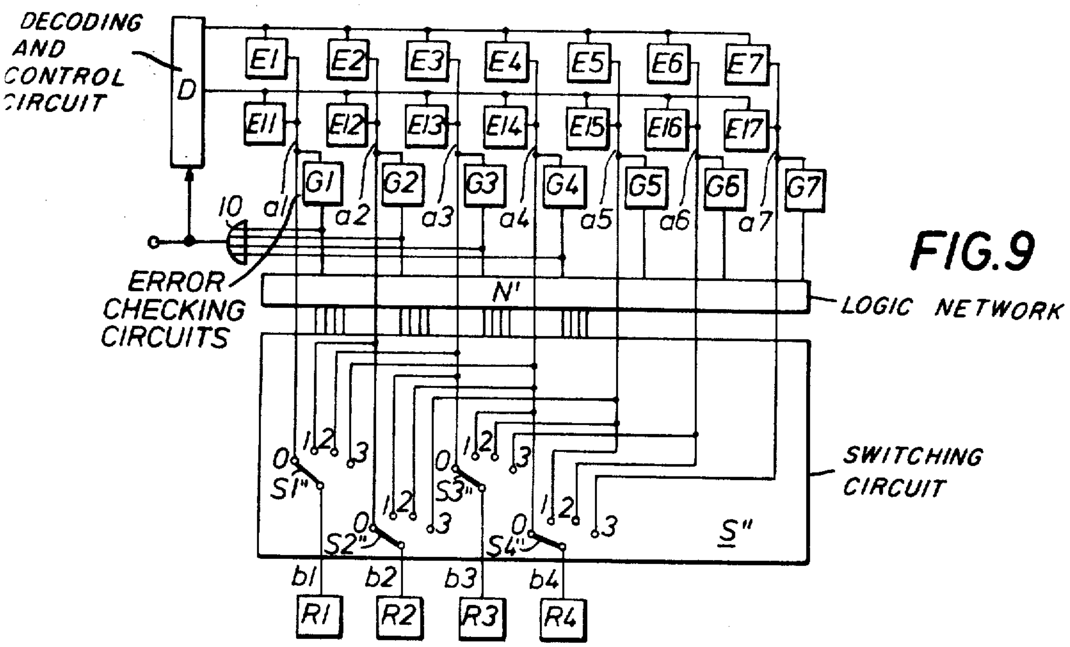
FIG. 9 is a block diagram of still a further embodiment of the present invention.

This embodiment will be explained with the aid of FIG. 9 where memory elements E1 – E7 and E11 – E17 which respectively represent two rows or words in a larger memory are shown. The illustrated memory is for the storage of four bit words and consequently, since seven memory elements are provided per word, a maximum of three memory elements per word are permitted to be defective in this example. Each row or word of the memory elements can be addressed via a decoding or address circuit D and all memory elements with the same bit location, i.e., E1 and E11, E2 and E12, etc. are arranged in columns. The outputs of the memory elements of each column are connected to a common output line *a*1 – *a*7, respectively and the complementary output lines *a*1–*a*7 may also be provided. When reading out a word from the memory it may result that some memory elements are defective, and accordingly it is then necessary to omit these memory elements in the evaluation of the information. This is accomplished in the manner proposed in the applicant's above-mentioned co-pending application by a logic network N' and switching arrangement S'' which permits the switching through of the output lines *a*1 – *a*7 of different columns of the memory elements to a total of four register stages R1 – R4, or to transfer values stored in register stages R1 – R4 to operational memory elements. Switching mechanism S'' contains four switches S1'' – S4'' each having four positions. Switches S1'' – S4'' are controlled by a logic network N' which has seven inputs which are each connected with the output of a respective error checking circuit G1 – G7. Each of the error checking circuits G1 – G7 has its input connected to the associated column lines *a*1 – *a*7, respectively, and comprises in the embodiment under consideration, a threshold value circuit, with the assumption that a faulty or unusable memory element will be recognized by a voltage which differs from logic values 0 and L. The arrangement, however, could also be made in such a way that the individual memory elements, if they are defective, emit a signal over a separate line which could then be fed directly to the logic network. The error checking circuits would then not be required. Or, preferably by the application of complementary read out lines, the checking circuits could be simple And-circuits. The logic network N' is so designed that whenever the first element, e.g., E1 of the interrogated word, is operational or usable, the network causes its value to be stored in register stage R1 or conversely causes the contents of register stage R1 to be stored in the memory element E1, respectively. If the first memory element E1 is defective and the second memory element E2 is operational, a connection of register stage R1 is established with memory element E2. In a similar manner connections are made when other memory elements are defective. The operation of the logic network N' and the switching circuit S''and detailed circuitry for the contents thereof are more fully disclosed in the above-mentioned co-pending application and in particular in FIGS. 7 and 10*a* – 10*d* and the description thereof.

The evaluation of the signals in the logic network N' and the actuation of switches S1'' – S4'' requires a certain amount of time. In order to eliminate the registers SRI and SRII which were provided in the embodiments of the above-mentioned co-pending application, the decoding circuit D is designed so that it furnishes a word selection or interrogation pulse of such a length that during the duration of this word selection pulse the logic linkages can be effected in the logic network N' and the required connections can be made by switching mechanism S''. During the duration of the word selection pulse the stored information is available at the outputs *a*1 – *a*7 of the memory elements of the addressed row. Thus the circuit is simpoified without any significant drawbacks resulting regarding the duration of the individual storage cycles.

The arrangement illustrated is assumed to be such that when memory elements E1 – E4 or E11 – E14 are free of defects, only these elements are used for storagee purposes. According to a further feature which is also based on the teachings of the above-mentioned co-pending application, and in particular FIG. 24 and the description thereof, means are now provided which produce an accelerated switching of the information from the memory elements to the register stages R1 – R4 or vice versa whenever the above-mentioned first four memory elements are found to be free of defects. In the illustrated case where during reading out or writing-in, register stages R1 – R4 are first connected via lines *a*1 – *a*4 with the first four memory elements and this connection can change only in dependence on the results of the check for defective or unusable memory elements, if the memory elements E1 – E4 are free from defects, the correct information is present in register stages R1 – R4 very soon after the initiation of the word selection pulse. This information however cannot as yet normally be evaluated by the external circuitry (not shown) since sufficient time must be normally provided to complete the checking operation for unusable memory elements and in the event sucn unusable memory elements are detected, to cause other memory elements to be connected to the register stages. As a result of the additional means provided by the present invention, which are indicated in the drawing by an OR gate 10 whose inputs are connected with the output lines of the error checking circuits G1 – G4, it is now possible immediately after the initiation of a word selection pulse to know whether the first four memory elements of the selected word are all usable since only in such case will the output of the OR circuit 10 be a 0. Alternatively, if any one of the first four memory elements is unusable, OR gate 10 has an output value L. The output value 0 of the OR circuit 10 during a word selection pulse can now be used to effect an immediate evaluation of the information contained in the first four memory cells.

According to a further feature of this embodiment of the invention, the decoding circuit D which furnishes the word selection pulse is designed so that it can furnish word selection pulses of at least two different durations depending on the way it is controlled and the decoding circuit D is connected with the output of the OR gate 10 in such a way that it emits the word selection pulse for the shorter duration only when the OR gate indicates a 0 during a word selection pulse. Thus the cycle duration of the memory can be shortened for error-free words which on the average leads to an acceleration of the time required for memory operation.

It will be understood that the above description of the present invention is susceptible to various modifications, changes and adaptations, and the same are intended to be comprehended within the meaning and range of equivalents of the appended claims.

I claim:

1. In a data storage system in which a very large number of identical memory elements with complementary output signals are combined into an integrated memory matrix in such a manner that words with a given number of bits are stored, and wherein, due to the manufacturing process employed, a portion of the memory elements in said memory matrix are unusable, the improvement comprising:

each word in said memory matrix being provided with additional memory elements in excess of the said given number of bits with the number (*n*) of said additional memory elements per word being selected to correspond to the number of unusable memory elements to be expected for each word; each of said unusable memory elements being so modified that it causes a distinctive signal to be emitted when it is interrogated which identifies the unusability thereof; means for interrogating all of the memory elements of one word prior to writing information in said memory matrix and prior to reading information out of said memory matrix, and, switching means, responsive to said distinctive signals emitted during interrogation identifying an unusuable memory element in an addressed word, for causing that information associated with the V-th unusable memory element, where $V = 1,2 \ldots n$, $n \geq 1$, to be stored in the V-th additional memory element during writing of a word into said memory matrix and for causing the information stored in the V-th additional memory element to be read out instead of the information furnished by the V-th unusable memory element during reading out of a word from said memory matrix.

2. The data storage system defined in claim 1 wherein said additional memory elements are provided in said memory matrix for each word spatially following the number of memory elements associated with said given number of bits.

3. The data storage system defined in claim 1 wherein said memory matrix is designed so that the error frequency of said additional memory elements is less than that of the memory elements of a word.

4. The data storage system defined in claim 1 wherein all of the first memory elements of all words are connected to common read and write lines, all of the second memory elements of all words are connected to respective common read and write lines, etc.; and wherein said switching means includes:

a plurality of recognition circuit means, one for each of said common read and write lines, for recognizing an unusable memory element of the word being addressed;

a plurality of first logic switching means, one for each of said common read and write lines, each of said first logic switching means being responsive to the output signals of the associated recognition circuit means and the associated memory element for interrupting or establishing, respectively, in dependence on whether or not an unusable memory element has been determined, the connection between said associated memory element and the associated input or output of said memory matrix; and, a second logic switching means responsive to the output signals from each of said recognition circuit means for establishing the connection between the input or output of said memory matrix associated with an unusable memory element and the associated additional memory element of the word being addressed.

5. The data storage system defined in claim 4 wherein: each of said memory elements is provided with a pair of read and write lines and said unusable memory elements have been modified so that they produce identical output signals on both of said pair of lines; each of said recognition circuit means is a respective first AND gate which is responsive to the outputs on both of said pair of lines; each of said first logic switching means is a respective second AND gate having one input connected to one of said pair of lines and a second negated input connected to the output of the respective said first AND gate, and an OR gate having one input connected to the output of the respective said second AND gate and its output connected to the associated input or output line for said memory matrix; and said second logic switching means includes a logic network means responsive to the output signals from each of said first AND gates for connecting the additional memory elements to an output line therefrom, and a plurality of third AND gates, each of which is associated with one of said recognition circuit means and one of said first logic switching means, each of said third AND gates having one input connected to an output line from said logic network means, a second input connected to the output of the associated first AND gate, and its output connected to a second input of the associated OR gate.

6. The data storage system defined in claim 5 wherein said memory matrix includes one additional memory element per word; and wherein said logic network means includes an OR gate having its inputs connected to the outputs of each of said first AND gates and its output connected to one input of a further AND gate, said further AND gate having its other input connected to the output of said additional memory element and its output connected to said second input of each of said third AND gates.

7. The data storage system defined in claim 5 wherein said memory matrix includes a plurality of said additional memory elements per word, and wherein said logic network means has a plurality of output lines, each of said output lines being connected to said second input of a different one of said third AND gates, a first plurality of input lines connected to the respective outputs of said first AND gates, and a second plurality of input lines connected to the outputs of the respective additional memory elements, said logic network means being responsive to a signal on one of said first plurality of input lines indicating an unusable memory element for connecting the output of the associated one of said additional memory elements to the corresponding one of said plurality of output lines.

8. The data storage system defined in claim 1 wherein said switching means includes: a separate recognition circuit means for determining the usability of a memory element for each bit location of the word, means responsive to an output signal from said recognition circuit means indicating an unusable memory element for blocking the input of writing signals to the associated bit location; and further means responsive to said output signal from said recognition circuit means for conducting the writing signals to the associated additional memory element for storage therein.

9. The data storage system defined in claim 1 wherein at least a portion of the words of said memory matrix are divided into partial words, all in the same manner so that the number of the usable memory elements to be expected in each partial word does not exceed a certain number; wherein a number (*n*) of additional memory cells is provided for each partial word which number corresponds to the number of unusable memory cells to be expected; and wherein a plurality of said switching means are provided, one for each partial word so as to cause the additional memory elements of each partial word to be used instead of the unusable elements of each partial word.

10. In a data storage system in which a very large number of identical memory elements are combined into an integrated memory matrix so that words having a given number of bits are stored, and wherein due to the manufacturing process employed, a portion of said memory elements are normally unusable and accordingly additional memory elements are provided for each word in excess of the given number of bits with the numer of said additional memory elements being selected to correspond to the number of unusable memory elements to be expected for said word, the improvement comprising: said memory elements being of the type which can be read out without the destruction of the contents thereof; each of said unusable memory elements being modified in such a manner that it emits a signal during interrogation which identifies the unusability of the memory element; a logic network means connected to the output lines of said memory matrix for detecting and evaluating the output signals from said memory elements during interrogation thereof to identify the position of the defective unusable memory elements; a switching means responsive to the output signals from said logic network means for storing those bits of a word which are to be stored in an unusable memory element in the next-following usable memory element of the word during writing in of information to the memory; means for supply a word selection pulse to the respective memory elements of a word to interrogate said memory elements and effect a read out thereof prior to writing of information therein in order to determine the presence of defective and unusable memory elements, said word selection pulse having a duration which is sufficiently long so that during said duration said logic network means can effect the necessary linkages and said switching means can effect the necessary connections to cause write-in of the information into only usable memory elements.

11. The data storage system defined in claim 10 further including control means responsive to the signals emitted by said memory elements of a word during interrogation for effecting a decreased travel time of data from or to said memory elements when the detected signals indicate that the particular word of the memory being read does not contain any unusable memory elements and hence switching to one of the additional memory elements is not required.

12. The data storage system defined in claim 11 wherein said means for supplying said word selection pulse can furnish word selection pulses of at least two different durations, one of which is shorter than said duration of said word selection pulse; and wherein said means for supplying said word selection pulse is responsive to the output signal from said control means to provide the word selection pulse of shorter duration when the output of said control means indicates the absence of unusable memory elements in the interrogated word.

* * * * *